(12) United States Patent
Harada et al.

(10) Patent No.: US 7,518,498 B2
(45) Date of Patent: Apr. 14, 2009

(54) METER FOR AUTOMOTIVE VEHICLE

(75) Inventors: Takeshi Harada, Shizuoka (JP);
Yoshiyuki Furuya, Shizuoka (JP);
Hirokazu Yabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 274 days.

(21) Appl. No.: 11/493,623

(22) Filed: Jul. 27, 2006

(65) Prior Publication Data

US 2007/0040662 A1   Feb. 22, 2007

(30) Foreign Application Priority Data

Aug. 18, 2005   (JP) ............................. 2005-237324

(51) Int. Cl.
*B60Q 1/00*   (2006.01)

(52) U.S. Cl. ..................... 340/461; 340/425.5; 340/438; 340/815.4; 340/815.45; 340/815.5; 340/815.53; 116/286; 116/288; 362/23; 362/27

(58) Field of Classification Search ................ 340/461, 340/462, 438, 815.4, 815.45, 815.5, 815.53, 340/425.5, 815.73; 116/286, 288; 324/115, 324/131; 362/23, 27
See application file for complete search history.

(56) References Cited

U.S. PATENT DOCUMENTS 5,949,346 A * 9/1999 Suzuki et al. .......... 340/815.45
6,281,788 B1 * 8/2001 Noll ........................... 340/461
6,714,126 B2 * 3/2004 Wada ......................... 340/438
2005/0174226 A1 * 8/2005 Heyden et al. .............. 340/461

FOREIGN PATENT DOCUMENTS

| JP | 6-885 | 1/1994 |
| JP | 10-301103 | 11/1998 |
| JP | 2004-290308 | 10/2004 |

* cited by examiner

*Primary Examiner*—Hung T. Nguyen
(74) *Attorney, Agent, or Firm*—Kratz, Quintos & Hanson, LLP

(57) ABSTRACT

The meter has a back light illuminating with a predetermined color, a display portion disposed in font of the back light and being changeable between a positive mode and a negative mode at a predetermined state, and a reverse control device determining whether an engine of a vehicle is in an initial starting step or the vehicle is in a running state. The control device reverses the display portion in response to a result of the determination. The control device changes the display portion from one of the positive and negative modes to the other at a lower speed when the control device determines that the vehicle engine is in an initial starting step than when the control device determines that the vehicle is in a running state. When the control device determines that the vehicle engine is in an initial starting step, the control device changes the display portion in one of the positive and negative modes from a neutral contrast state.

4 Claims, 11 Drawing Sheets

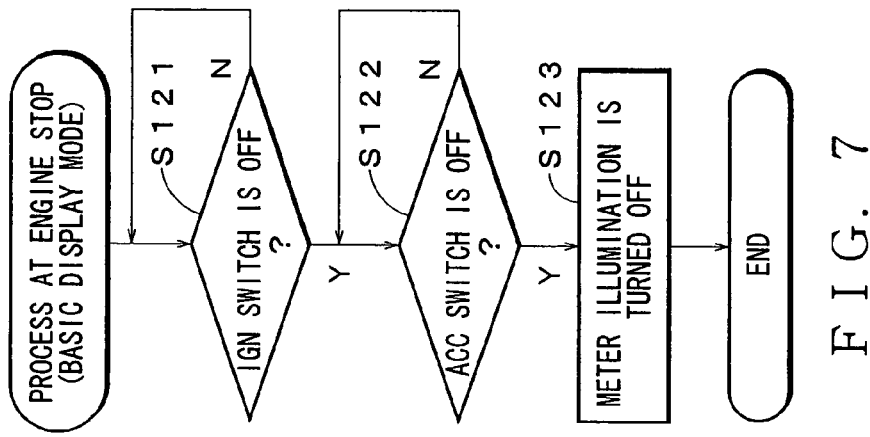
FIG. 7
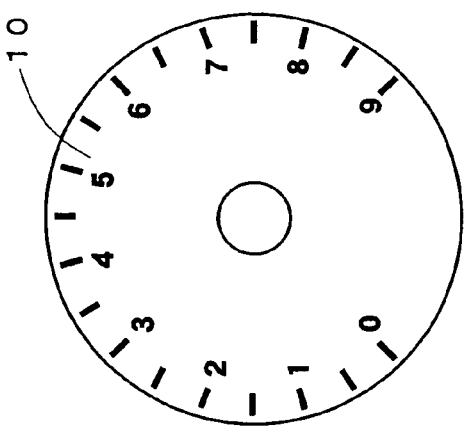
FIG. 3A
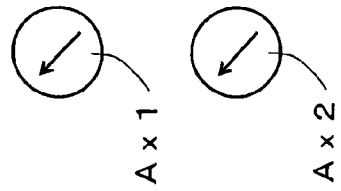
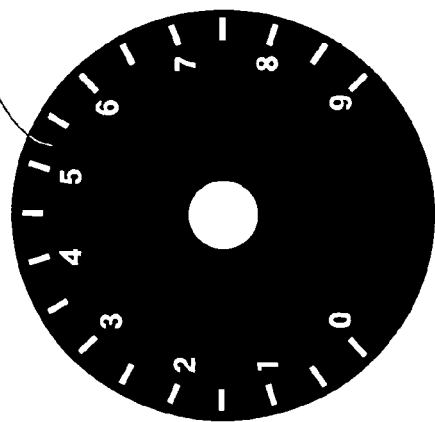
FIG. 3B
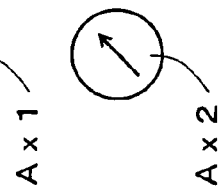

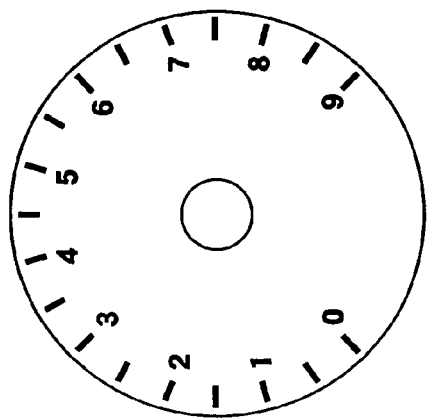 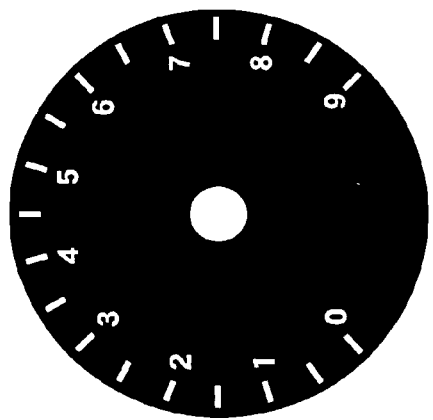
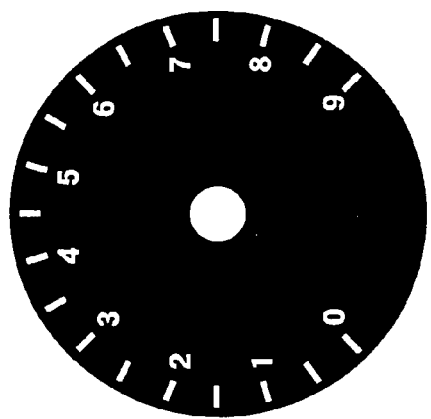 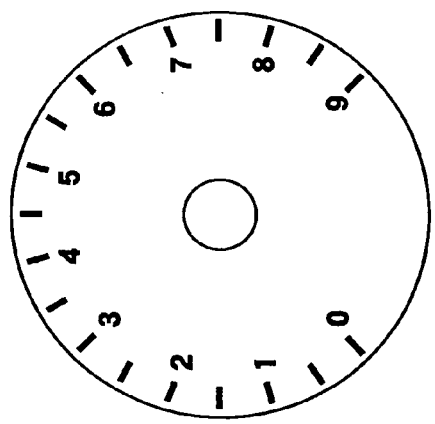
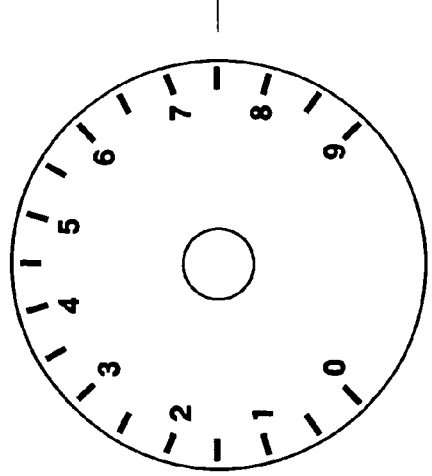
FIG. 8A
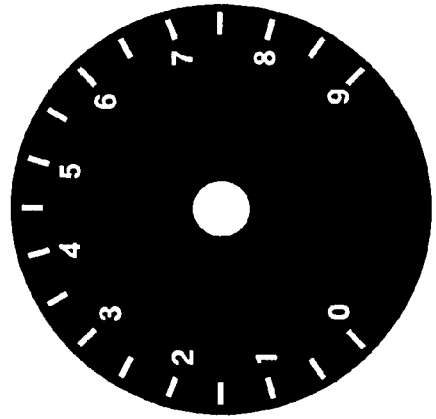
FIG. 8B

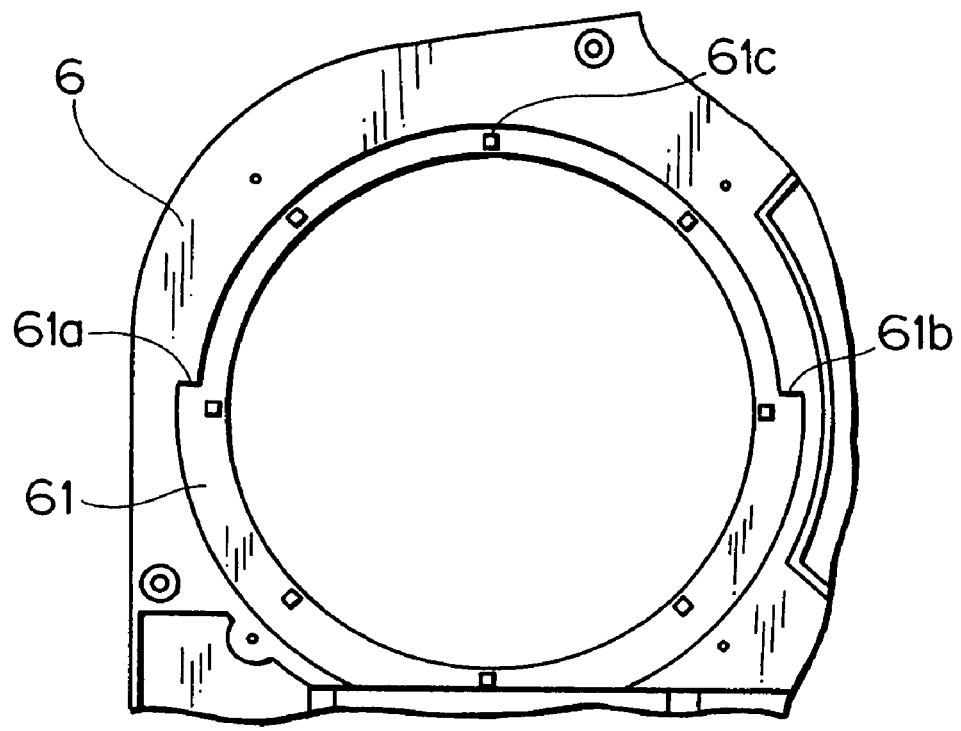
F I G. 1 3 A
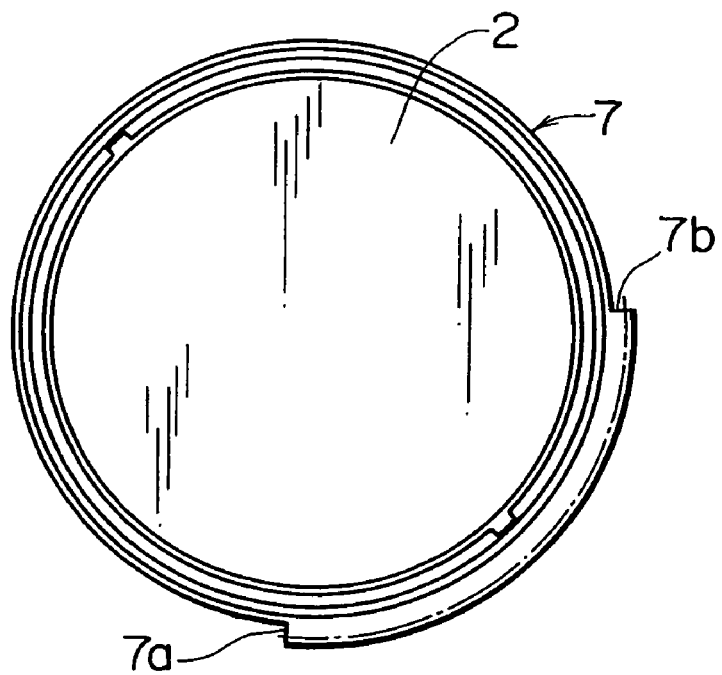
F I G. 1 3 B

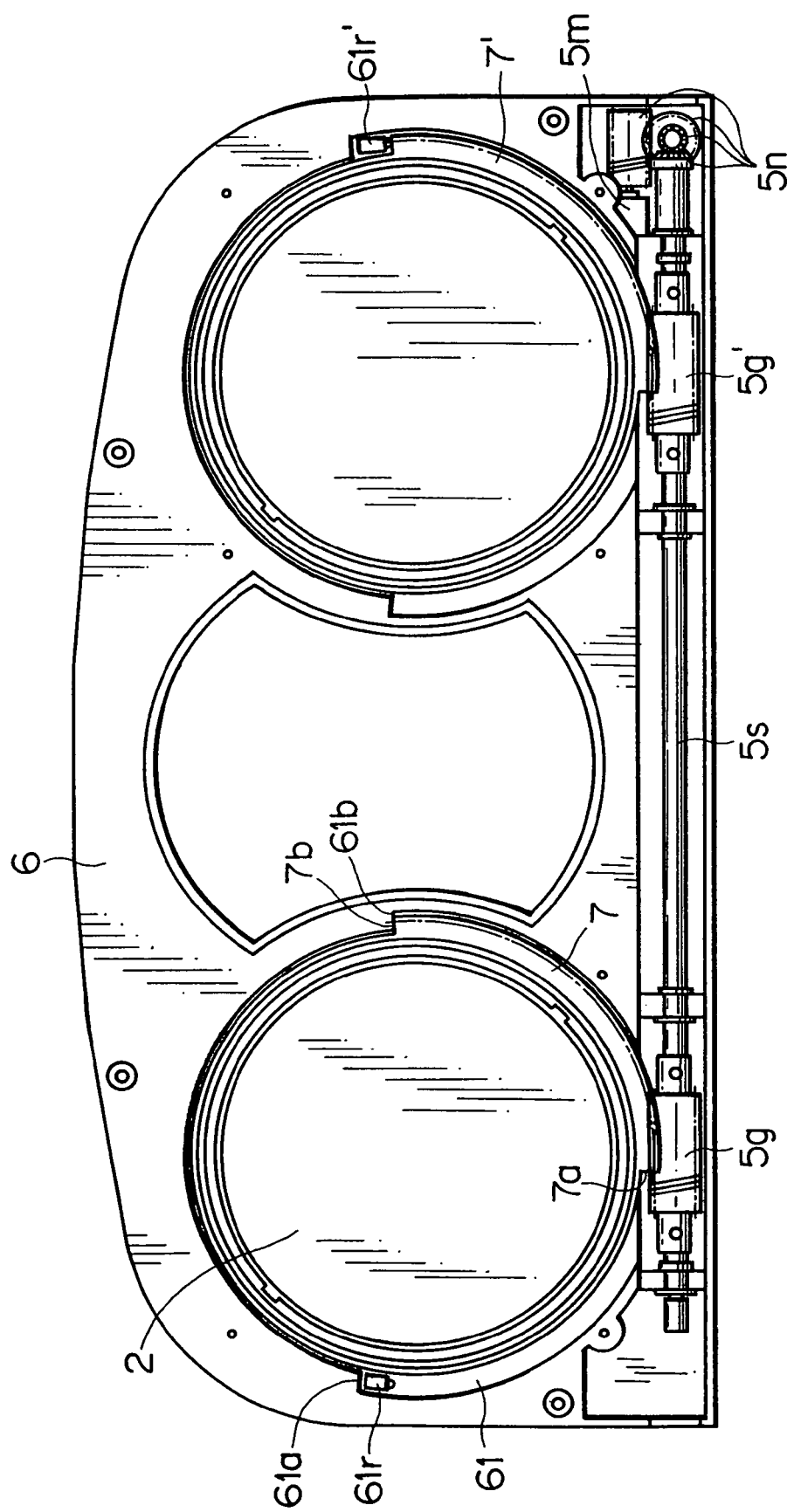

METER FOR AUTOMOTIVE VEHICLE

BACKGROUND OF THE INVENTION

1. Field of the Invention

The present invention relates to a meter of an automotive vehicle, particularly to a vehicle meter changeable in positive and negative displaying states thereof.

2. Related Art

At start of an engine, a conventional meter of an automotive vehicle illuminates itself by variable color lights or by a plurality of back lights that are turned on sequentially from a middle toward the outside of the meter or vice versa. This produces a preferable impression on a driver of the vehicle.

Furthermore, a black-white reverse meter has been provided, which displays selectively black letters on a white dial plate and white letters on a black dial plate. In the daytime, the black letters are displayed on the white dial plate, while at night, the white letters are displayed on the black dial plate.

As related arts with the present invention, the following documents are listed.

Japanese Utility Model Application Laid-open No. H6-885;

Japanese Patent Application Laid-open No. H10-301103; and

Japanese Patent Application No. 2004-290308.

Recently, a vehicle meter is required to have a more impressive effect to increase a market value of the vehicle. The conventional vehicle needs to provide a more attractive, impressive, or novel meter than those described above.

SUMMARY OF THE INVENTION

In view of the aforementioned situation, an object of the invention is to provide a novel and impressive meter of a vehicle without an expensive display device.

For achieving the object, a meter for an automotive vehicle includes:

a back light for illumination with a predetermined color, a display portion disposed in font of the back light and being changeable between a positive mode and a negative mode at a predetermined speed, and a reverse control device determining whether an engine of the vehicle is in an initial starting step or the vehicle is running, the control device reversing the display modes at a speed in response to the determination.

The reverse between the positive and negative modes produces a novel and impressive effect at engine start and during running of the vehicle.

Preferably, the control device changes the display portion from one of the positive and negative modes to the other at a lower speed when the control device determines that the vehicle engine is in an initial starting step than when the control device determines that the vehicle is running.

Thus, a driver can see the reverse process with a slow speed between the negative and positive modes at engine start, while he can see the reverse process with no interference to safety operation of the vehicle during running of the vehicle.

Preferably, when the control device determines that the vehicle engine is in an initial starting step, the control device changes the display portion in one of the positive and negative modes from a neutral contrast state.

Thus, in response to engine start, the display portion is changed in the positive or negative state. That is, when an ignition key is turned, indication of the display portion gradually appears, providing a novel display process.

Preferably, the display portion has a first deflecting plate, a second deflecting plate, and a ½ λ phase difference portion, the second deflecting plate disposed in front of the first deflecting plate, the ½ λ phase difference portion fitted on the first deflecting plate for providing a meter design having a scale and letters. The reverse control device controls a reverse operation control unit for changing a first deflecting axis of the first deflecting plate and a second deflecting axis of the second deflecting plate to be parallel or perpendicular to each other.

Thus, the ½ λ phase difference portion and the deflecting plates allow the reverse between the positive and negative modes. A novel and impressive process of the display is enabled without an expensive display device. The combination of the ½ λ phase difference portion and the deflecting plates can achieve a real black color. This also provides a fresh and novel effect of the display.

BRIEF DESCRIPTION OF THE DRAWINGS

FIGS. 3A and 3B are views showing display images of the reverse of positive and negative modes according to the principle of FIG. 2;

FIG. 7 is a flowchart showing a basic display mode at stopping of a vehicle engine;

FIGS. 8A and 8B are views showing display images of the basic display mode;

FIG. 13A is a front view showing the case, and FIG. 13B is a front view showing the holder;

FIG. 15 is a front view of a combination meter incorporated with deflecting plates to show another vehicle meter.

DETAILED DESCRIPTION OF PREFERRED EMBODIMENT

Referring to the accompanied drawings, embodiments of the present invention will be discussed.

Figure 1:
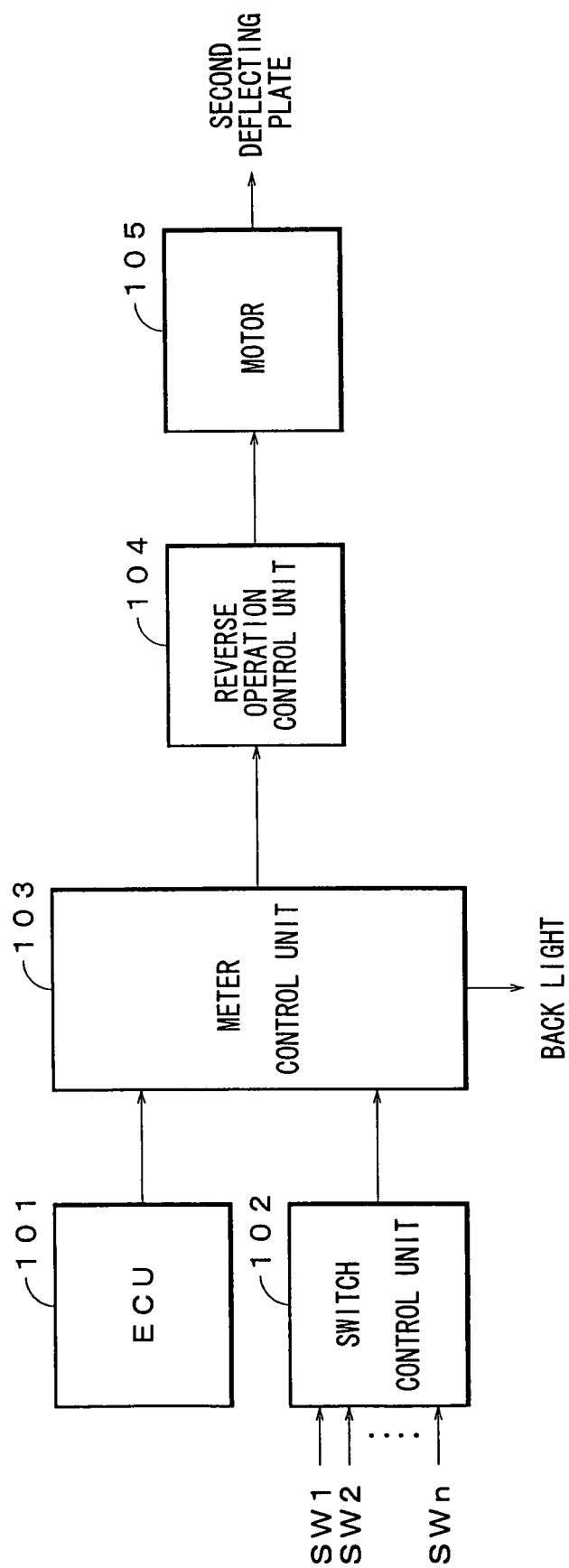
FIG. 1 is a block diagram showing a whole system associated with a vehicle meter according to the present invention.

In FIG. 1, an ECU (Electronic Control Unit) 101 mounted in an automotive vehicle outputs signals of engine revolutions and vehicle running speeds to a meter control unit 103. The signals of engine revolutions and vehicle running speeds are obtained respectively from an engine revolution sensor and a speed sensor. A switch control unit 102 receives switching signals from a plurality of switches SW1, ..., SWn including illumination switches to output the signals to the meter control unit 103.

The meter control unit 103 basically controls a vehicle meter of an embodiment and has a microcomputer. The meter control unit 103 receives the signals of engine revolutions, vehicle speeds, and illumination to output the signals to a reverse process control unit 104. The meter control unit 103 also outputs a back light signal to the reverse process control unit 104 to turn on or off a back light.

The reverse process control unit 104 receives the signals of engine revolutions, vehicle speeds, and illumination to output a control signal to a motor 105 to rotate the motor 105. More specifically, the control signal turns a second deflecting plate discussed later at a predetermined speed. That is, the control signal controls the motor 105 to turn the motor normally or adversely or to stop it for providing a reverse process between positive and negative display states. The motor 105 is a device rotating normally and adversely with variable speeds in response to control signals. The reverse process control unit 104 corresponds to a reverse control device described in claims.

Next, a basic principle for achieving reverse of positive and negative display states will be discussed. As shown FIG. 2A, a vehicle meter of an embodiment includes a first deflecting plate 1 and a second deflecting plate 2. Particularly, the first deflecting plate 1 has a ½ λ phase difference portion 11 having letters (numerals) and scale bars that are defined by ½ λ phase difference pieces. The ½ λ phase difference portion 11 is attached to the first deflecting plate 1 with a glue or an adhesive. The deflecting plate 1 has a fixed deflection axis AX1 and the second deflecting plate 2 has a deflection axis AX2 that turns between a first direction parallel to the deflection axis AX1 and a second direction perpendicular to the deflection axis AX1 as shown by an arrow R.

When the deflection axis AX2 is parallel to the deflection axis AX1, light L emitted from the back light passes through the deflecting plates. Meanwhile, when the deflection axis AX2 is perpendicular to the deflection axis AX1, light L emitted from the back light is blocked by the deflecting plates. The ½ λ phase difference portion 11 has an axis that is inclined by 45° from a deflecting axis to change its deflection direction, for example from P deflection to S deflection. The embodiment of the present invention utilizes this function.

Figure 2A:
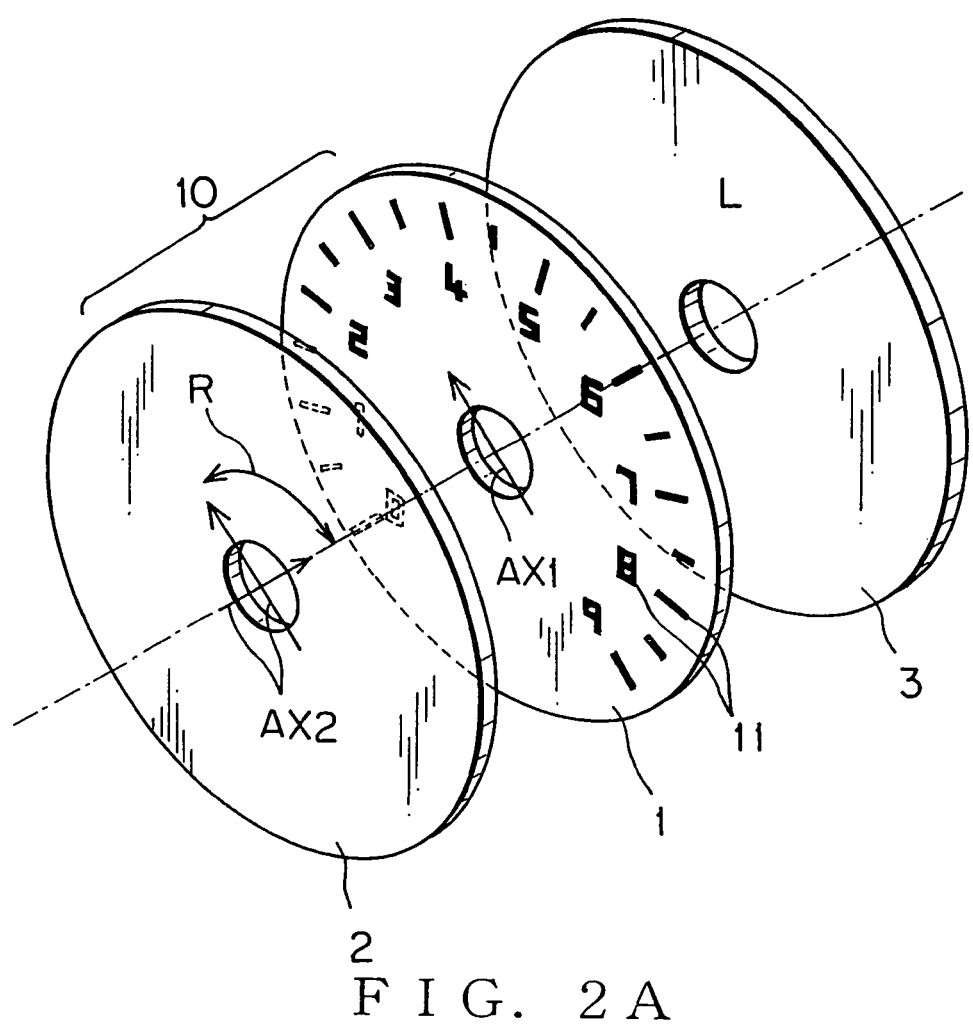
FIGS. 2A and 2B are perspective views showing a reverse principle of positive and negative modes according to an embodiment of the present invention.
Figure 2B:
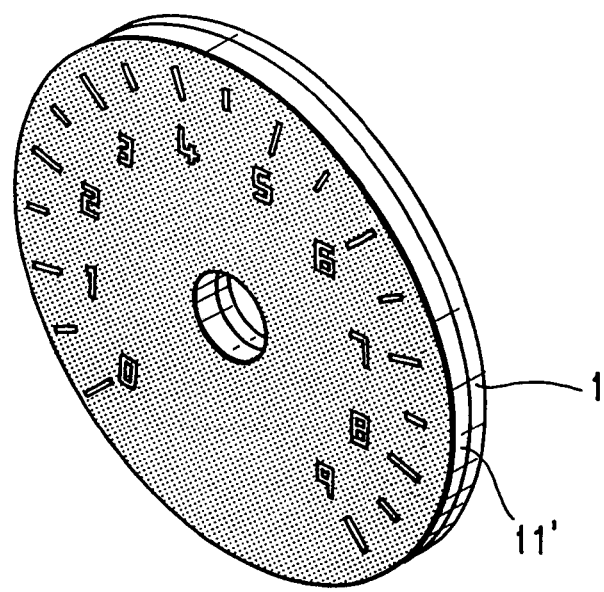

Alternatively, as shown in FIG. 2B, a ½ λ phase difference plate 11' having the same circular shape as the first deflecting plate 1 may be put and secured on the first deflecting plate 1. The ½ λ phase difference plate 11' has letters and scale bars cut out therethrough. In FIGS. 2A and 2B, the deflection directions of letters/scale bars and the deflecting plates can be different. In FIG. 2B, a back light (not shown) is similar to that of FIG. 2A.

Referring to FIGS. 3A and 3B, when the deflection axis AX1 of the deflecting plate 1 is parallel to the deflection axis AX2 of the deflecting plate 2 in FIG. 2A, the light L from the back light 3 passes the deflecting plates. The transmission ratio of the light L is about 32% and dependent on types and materials of the deflecting plates. Since the letters and scale bars are defined by the ½ λ phase difference portion, the light L from the back light 3 is blocked at the letters and scale bars. The transmission ratio in the letters and scale bars is about 0.1 to 1%, though it is dependent on types and materials of the deflecting plates. Thus, as shown in FIG. 3A, the letters and scale bars in a black color are displayed on a dial plate 10. Strictly speaking, the black color is not a real black but very close to the real black.

On the contrary, when the deflection axis AX1 of the deflecting plate 1 is perpendicular to the deflection axis AX2 of the deflecting plate 2 in FIG. 2A, the light L from the back light 3 passes the letters and scale bars while the light L is blocked by the dial plate 10. Thus, as shown in FIG. 3B, the letters and scale bars having a color of the back light 3 is displayed on the dial plate 10.

For example, when the back light 3 emits white light, a dial plate capable of reverse in white and black colors is obtained by changing relationships (parallel or perpendicular) between the deflecting axes of the deflecting plates 1 and 2.

When the configuration of the FIG. 2B is used in place of the FIG. 2A, the display states of FIGS. 3A and 3B are basically changed to each other. That is, when the deflection axes of the deflecting plates are parallel to each other, the state of FIG. 3B is achieved. Meanwhile, when the deflection axes of the deflecting plates are perpendicular to each other, the state of FIG. 3A is achieved.

A vehicle meter utilizing the basic principle can accomplish a substantially real black which is not an artificial black defined by printing or the like. This provides a clear contrast of the vehicle meter. In the vehicle meter, the light L from the back light 3 illuminates with a transmission ratio of about 32% at a light transmitted part and with a transmission ratio of about 1% at a light blocked part. This achieves a contrast ratio of 32:1. When an additional external light has a surface reflection ratio of 5%, an actual contrast ratio becomes about 37:6. Therefore, a non-reflection process such as an anti-reflection coat is preferably provided.

Figure 4:
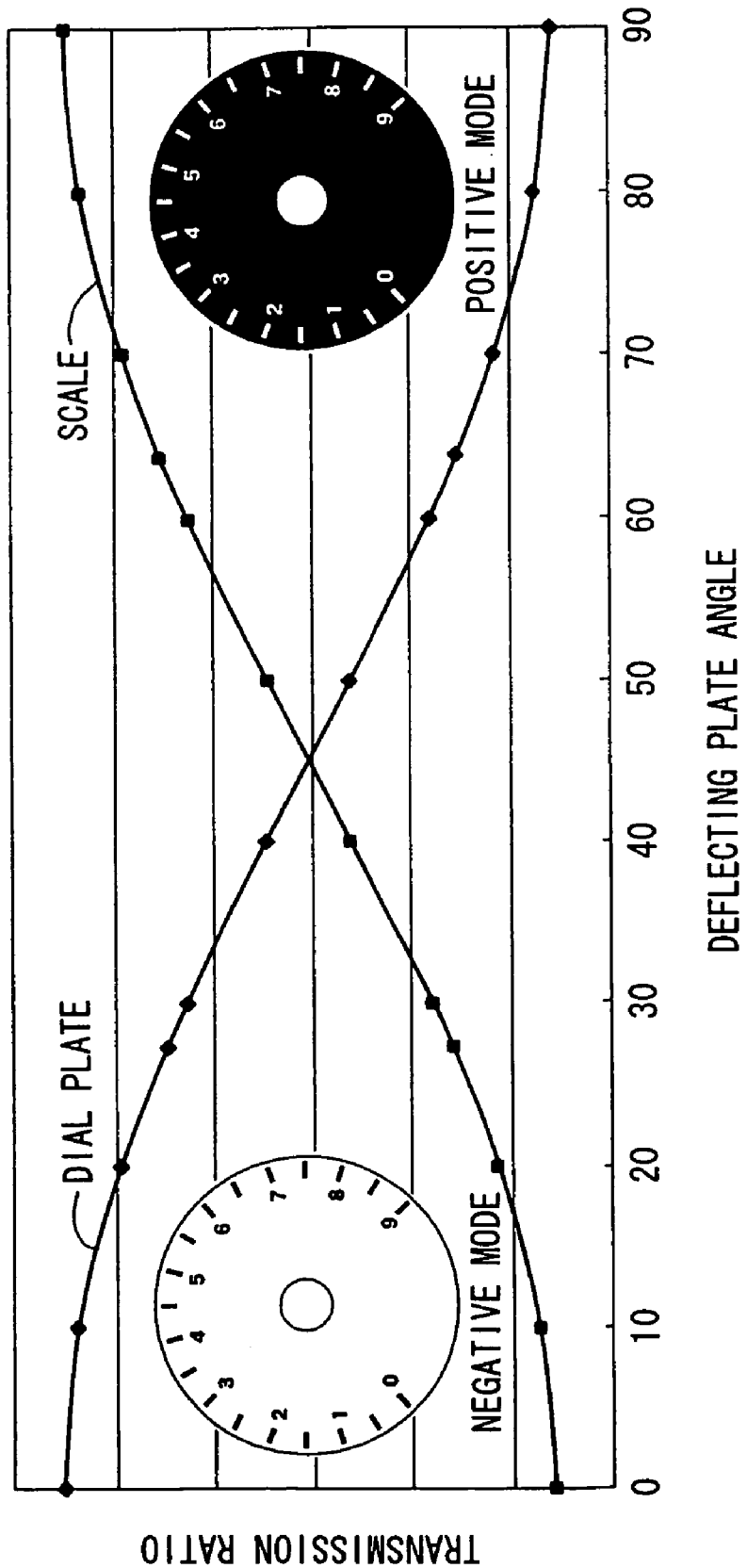
FIG. 4 is a graph showing variation of reverse of positive and negative modes in respect of a vehicle meter according to an embodiment of the present invention.

FIG. 4 shows varying processes of reverse of the negative and positive modes utilizing the basic principle. The deflecting plates gives a maximum contrast ratio when the deflecting axes of the deflecting plates 1 and 2 intersect at 0° or 90°. This provides a good visibility, so that these angles are utilized in a normal condition. At an intermediate intersection angle between 0° to 90° of the deflecting axes of the deflecting plates, the contrast ratio is reduced. Therefore, one of the deflecting plates is turned at a comparatively high speed to keep a sufficient visibility particularly during running of the vehicle.

On the contrary, at engine start, a slow tuning speed of the one of the deflecting plates is selected because the vehicle is stopping. Thereby, the reverse process between the negative and positive modes can be slowly carried out to give a novel impression to the driver. Thus, the reverse process between the negative and positive modes is applied to give a novel impression to the driver at the engine start and during running of the vehicle. The reverse speed can be selected desirably.

As a novel and impressive example, at engine start, a default pattern of a positive mode (or a negative mode) is displayed and is reversed to a negative mode (or a positive mode) to return again to a positive mode (or negative mode). This mode change can be desirably selected. In the specification, the positive mode means that white letters and scale bars are displayed on a black dial plate, while the negative mode means that black letters and scale bars are displayed on a white dial plate.

Figure 9:
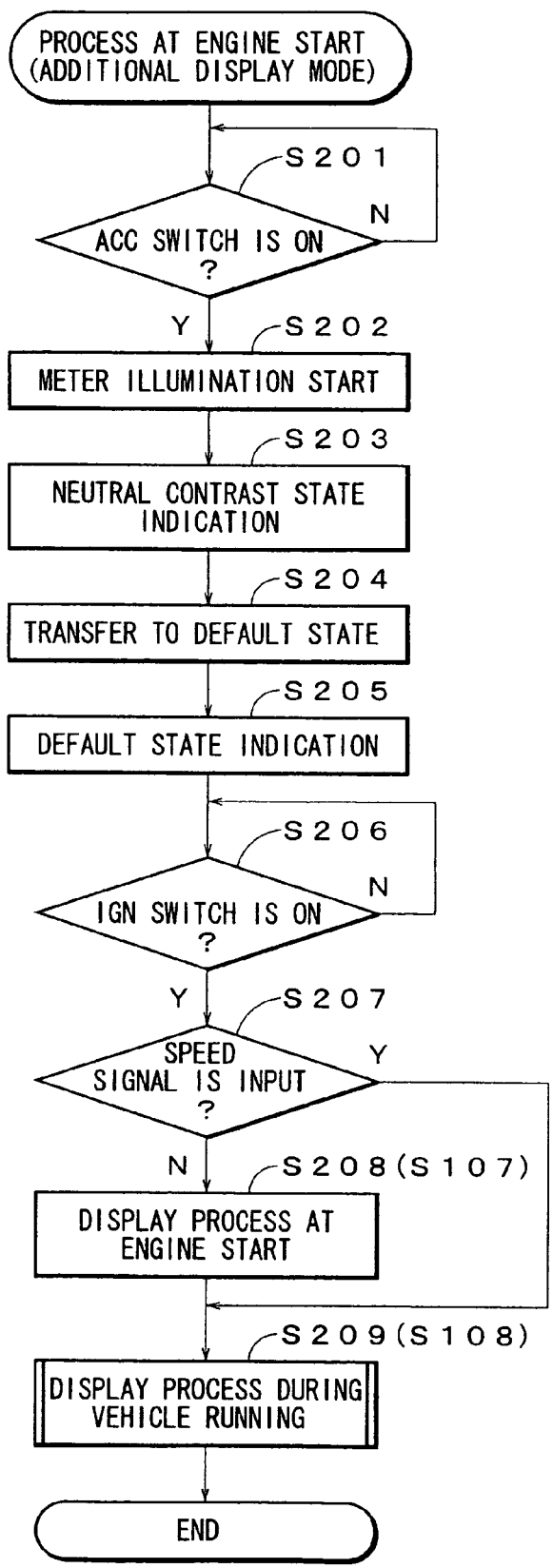
FIG. 9 is a flowchart showing an additional display mode at start of a vehicle engine.
Figure 10:
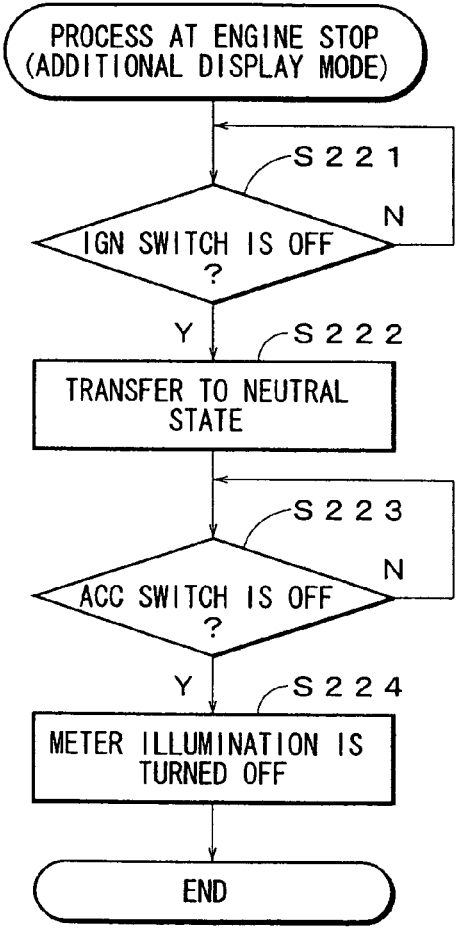
FIG. 10 is a flowchart showing an additional display mode at stopping of the vehicle engine.
Figure 11:
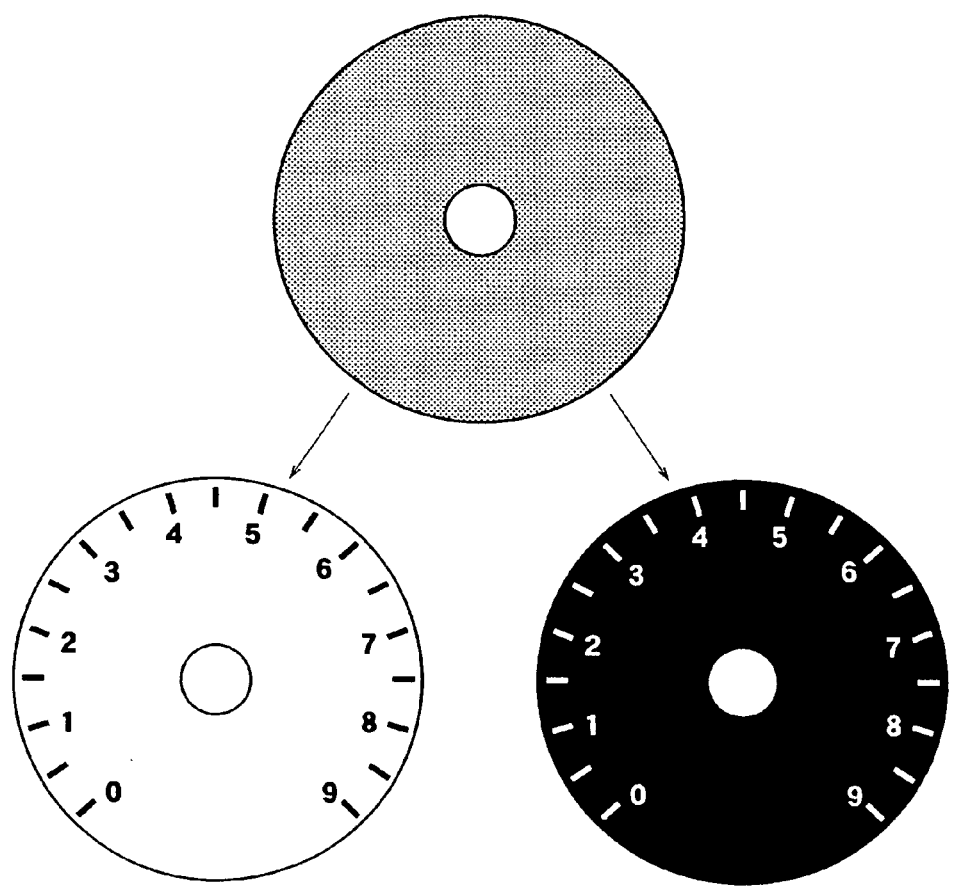
FIG. 11 is a view showing display images of an additional display mode.

Next, referring to FIGS. 5 to 11, a display process of an embodiment of a vehicle meter according to the present invention will be discussed. FIGS. 5 to 8 show flowcharts and images of a basic display mode according to the embodiment. FIGS. 9 to 11 show flowcharts and images of an additional display mode according to the embodiment.

Figure 5:
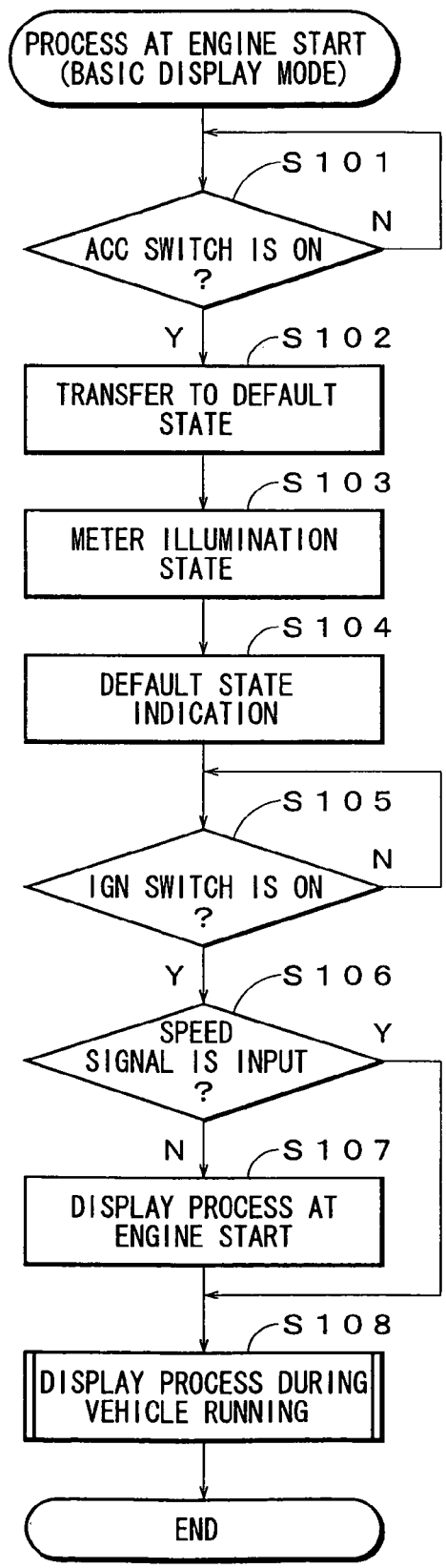
FIG. 5 is a flowchart showing a basic display mode at start of a vehicle engine.

In a basic display mode, as shown in FIG. 5, step S101 determines whether a vehicle key is turned on (Y in step S101) with ACC (accessory) switches or not (N in step S101). When the ACC switches become on, the execution goes to step S102 to show a default state. The default state is an initial positive mode (or negative mode). A next step S103 initiates illumination of a vehicle meter and then step S104 displays the default state. The illumination is given by the back light 3 shown in FIG. 2.

Next, step S105 waits until a key position becomes in IGN-on-state. When IGN (ignition) becomes on (Y in step S105), step S106 determines whether a vehicle speed signal has been input or not. When the decision is that no vehicle speed signal has been input (N in step 106), step S107 executes an engine start display process. Meanwhile, When the decision is that a vehicle speed signal has been input (Y in step 106), step S108 executes a normal vehicle running display process.

In a process at engine start, as shown in FIG. 8A, a default state of a negative mode is displayed to be reversed into a positive mode and then the display returns to the negative mode. Alternatively, as shown in FIG. 8B, a default state of a positive mode is displayed to be reversed into a negative mode and then the display returns to the positive mode. This is achieved by the motor 105 that turns the deflecting plate 2 of FIG. 2 normally and adversely by 90°.

Figure 6:
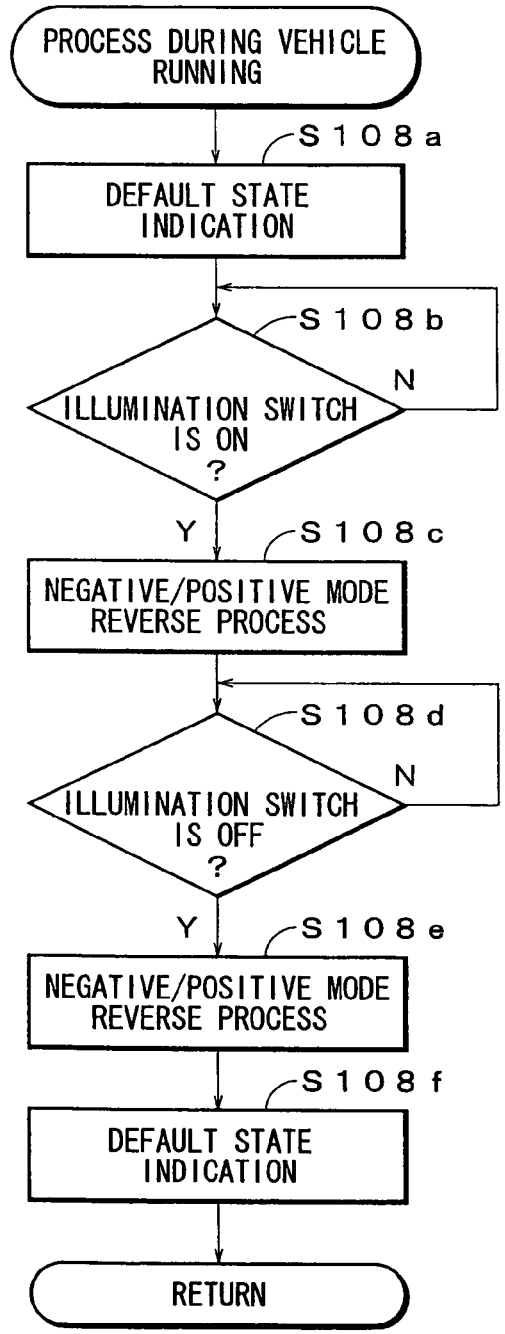
FIG. 6 is a flowchart showing a basic display mode during a normal running state of the vehicle.

In the normal running process shown in FIG. 6, step 108a displays the default state of step S104, and step 108b waits until an illumination switch turns on. When the illumination switch becomes on (Y in step S108b), the execution goes to step S108c to carry out reverse of the negative and positive modes. That is, when the default state is a positive mode, the default state is changed to a negative mode. Meanwhile, when the default state is a negative mode, the default state is changed to a positive mode. Note that a speed of the reverse process becomes higher than at the engine start by controlling rotation of the motor 105.

Next, step S108d waits until the illumination switch becomes off. When the illumination switch becomes off (Y in step s108d), a next step S108e performs reverse of negative and positive modes and a further next step S108f displays the default state again. The basic display mode carries out these processes. At engine stop condition, as shown in FIG. 7, an engine stop display process is given as an interruption process.

That is, in FIG. 7, step S121 waits until the key is turned to IGN-off position, and step S122 waits until the key is turned to ACC-switch-off position. When the key is turned to IGN-off position (Y in S121) and the key is turned to ACC-switch-off position (Y in step S122), the execution goes to step S123 where meter illumination by the back light 3 of FIG. 2 is turned off. Thereby, the back light 3 is turned off with the default state being maintained.

Thus, the basic display mode can show slowly a reverse process of the negative and positive modes at engine start, while the basic display mode can show a reverse process of the negative and positive modes without an adverse effect for a driver's visibility during running of the vehicle.

Meanwhile, as shown in FIG. 9, in an additional display mode, step S201 waits the key is turned to ACC-switch-on position. The key is turned to ACC-switch-on position (Y in step 201), the execution goes to step S202 to turn on meter illumination, and step S203 displays a 1:1 contrast state. That is, before ACC switches turn on, the second deflecting plate 2 of FIG. 2 is set to display the 1:1 contact state. In this state, the deflecting axes of the deflecting plates intersect with each other at 45° as shown in FIG. 4.

A next step S204 prepares for a default state and step S205 displays the default state. To provide the default state, the deflecting axis of the second deflecting plate 2 is controlled by rotating the motor 105 of FIG. 1. The default state has been discussed already. Thereby, as shown FIG. 11, a neutral state (1:1 contrast state) changes to gradually indicate display contents (default state).

A next step S206 waits until the key is turned to IGN-on position. When the IGN becomes on (Y in step S206), step S207 determines whether a speed signal has been input or not. When step S207 determines that no speed signal has been input (N in step S207), step S208 carries out an engine start display process. Meanwhile, when the decision is that a speed signal has been input (Y in step S207), step S209 carries out a display process during running of the vehicle.

The engine start display process of step S208 is the same as that of step S107, and the normal running display process of step S209 is the same as that of step S108. Thus, the discussions thereof are not repeated. These processes are carried out in the additional display mode. At engine stop condition, as shown in FIG. 10, an engine stop display process is carried out as an interruption process.

That is, as shown in FIG. 10, step S221 waits until the key is turned to IGN-off position. When the key is turned to IGN-off position (Y in step S221), step S222 displays the 1:1 contrast state. A next step S223 waits until the key is turned to ACC-switch-off position. When the key is turned to ACC-switch-off position (Y in step S223), a next step S224 turns off meter illumination, thus the back light 3 of FIG. 2. Thereby, the illumination is turned off with the 1:1 contrast ratio being maintained.

Thus, in the additional display mode, at engine start, the meter display is changed from the 1:1 contrast state to the negative or positive display state. Therefore, the turning of the ignition key indicates gradually display contents from the neutral state having no information. Accordingly, a novel, impressive display of the meter display is accomplished.

Next, referring to FIGS. 12 to 15, a specific configuration of a vehicle meter incorporated with the deflecting plates will be discussed.

Figure 12A:
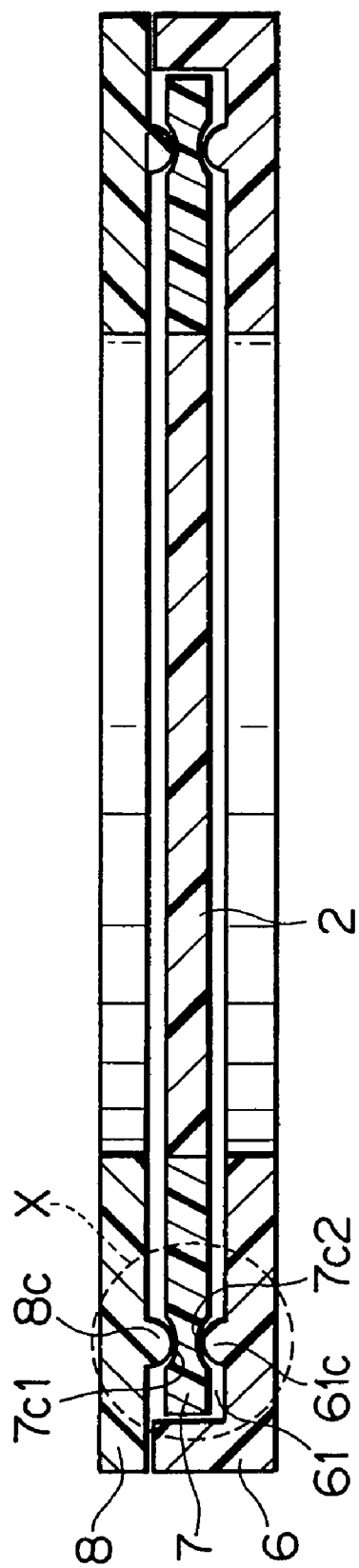
FIG. 12A is a sectional view showing a deflecting plate with a holder which is received in a case and a protection cover.
Figure 12B:
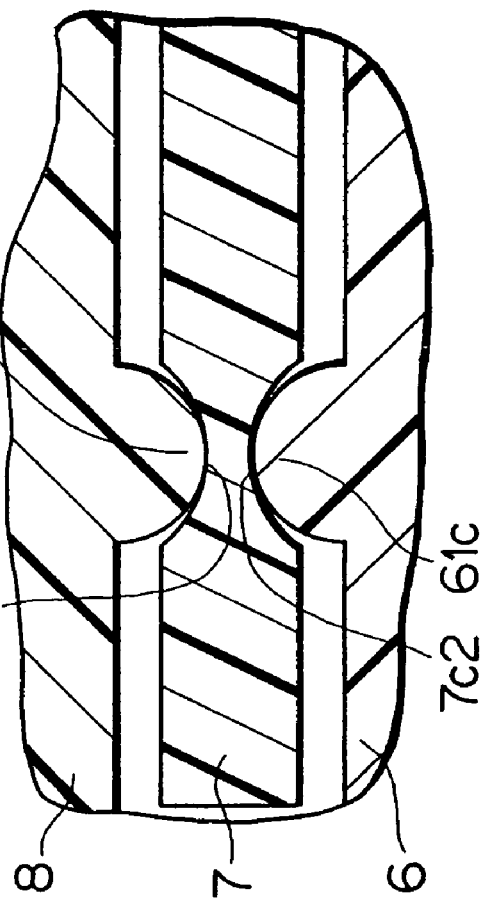
FIG. 12B is an enlarged view of a portion surrounded by circle X.

As shown in FIG. 12A, the second deflecting plate 2 is supported by a holder 7 and is sandwiched between a case 6 and a cover 8. As shown in FIGS. 12A and 12B, the case 6 and the cover 8 have a plurality of semi-spherical protrusions 8c or 61c each disposed circumferentially at regular intervals. The protrusions 8c, 61c may not be the same number as each other.

The holder 7 has upper and lower surfaces formed with a semi-circular channel 7c1 or 7c2. The semi-circular channels 7c1 and 7c2 each have a radius larger than that of the protrusions 8c and 61c and point-contact the protrusions 8c or 61c. Thus, the second deflecting plate 2 and the holder 7 are retained by the case 6 and the cover 8 with the point contact state, so that the second deflecting plate 2 and the holder 7 can turn smoothly with a small frictional resistance. The holder 7 with the deflecting plate is limited in upward and downward movement and eccentric turn thereof by the guiding arrangement of the protrusions 8c, 61c and the channels 7c1, 7c2. Furthermore, the semi-circular shapes of the protrusions 8c, 61c and channels 7c1, 7c2 are easily molded, decreasing a manufacturing cost of the vehicle meter.

Since the holder 7 with the second deflecting plate 2 does not turn always, wear due to the point contact is little. However, a lubricant will be better provided at the contact points. The case 6, the holder 7, and the cover 8 will be made of an oleo-resin such as polyacetal to reduce wear thereof. This also allows smooth turn of the holder 7 and reduces noises rendered by the turn of the holder 7.

Figure 14:
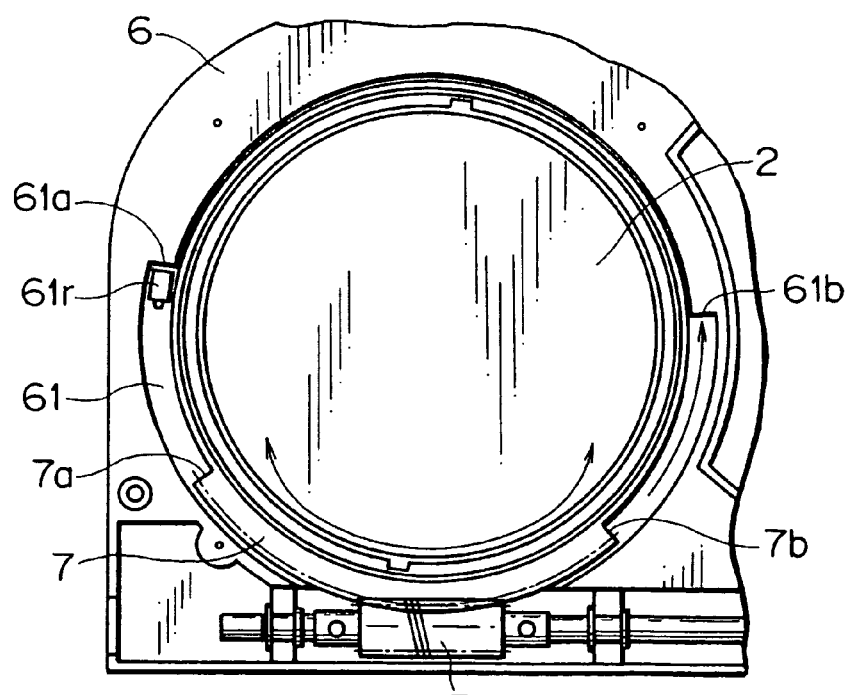
FIG. 14 is a partial front view of the vehicle meter for showing turning processes of the deflecting plates.

Next, referring to FIGS. 13 and 14, configurations and a control process of the case 6 and the holder 7 will be discussed. The vehicle meter capable of reverse between the negative and negative modes needs to control the second deflecting plate to turn by 90°. To limit the turning angle of the holder 7, the case 6 and the holder 7 have shoulders 61a, 61b and 7a, 7b respectively, as shown in FIGS. 13A, 13B. This configuration requires no encoders and stepping motors, reducing a manufacturing cost of the vehicle meter.

To control turning angles, an increase of electric current of the motor is detected when the holder 7 abuts against the shoulders (refer to an arrow of FIG. 14) for on-off control of the motor. Alternatively, as shown in FIG. 14, a limit switch 61r may be arranged in the case 6 to contact the shoulder 7a of the holder 7 that turns in an arrow direction via a gear 5g as shown in FIG. 14.

FIG. 15 shows a combination meter utilizing such limit switches. A limit switch 61r is disposed in a left meter to detect its contacting with a holder 7 that turns clockwise, and a limit switch 61r' is disposed in a right meter to detect its contacting with another holder 7' that turns counterclockwise. The left and right holders 7, 7' are driven via gears 5g, 5g' connected to a single shaft 5s, allowing synchronous movements of the left and right holders 7, 7'. The shaft 5s is rotated via a gear 5n by a motor 5m. This simple configuration for limiting the turning of the holders 7, 7' reduces a manufacturing cost of the meter.

As discussed above, according to the embodiments of the present invention, there is provided a vehicle meter capable of novel and impressive display without utilizing an expensive display device. Particularly, the deflecting plate incorporated with the ½ λ phase difference portion indicates not an artificial black color but a real black color, providing a most fresh and impressive vehicle meter.

The present invention is applied not only to the combination meter but also to a single dial meter or to a meter other than vehicle meters.

What is claimed is:

1. A meter for an automotive vehicle comprising:
a back light illuminating with a predetermined color,
a display portion comprising a first deflecting plate, a second deflecting plate, and a phase difference portion for providing a meter design having scales and letters, the display portion disposed in front of the back light and being changeable between a positive mode and a negative mode at a predetermined speed, and
a reverse control device determining whether an engine of the vehicle is in an initial starting step or the vehicle is in a running state, the control device reversing the display portion at a speed in response to a result of the determination, wherein the reverse control device has a reverse operation control unit for controlling an intersection angle between a first deflecting axis of the first deflecting plate and a second deflecting axis of the second deflecting plate so as to at least partly transmit or block light emitted from the back light, the intersection angle being from 0° to 90°.

2. The meter according to claim 1 wherein the control device changes the display portion from one of the positive and negative modes to the other at a lower speed when the control device determines that the vehicle engine is in an initial starting step than when the control device determines that the vehicle is in a running state.

3. The meter according to claim 1 wherein, when the control device determines that the vehicle engine is in an initial starting step, the reverse control device changes the display portion in one of the positive and negative modes from a neutral contrast state.

4. The meter according to claim 1, wherein the phase difference portion is a ½ λ phase difference portion, fitted on the first deflecting plate, and the second deflecting plate is disposed in front of the first deflecting plate.

* * * * *